United States Patent
Lee et al.

(10) Patent No.: US 10,964,483 B2
(45) Date of Patent: Mar. 30, 2021

(54) CAPACITOR COMPONENT AND METHOD FOR MANUFACTURING THE SAME

(71) Applicant: SAMSUNG ELECTRO-MECHANICS CO., LTD., Suwon-si (KR)

(72) Inventors: Dae Sung Lee, Suwon-si (KR); Chi Yong Park, Suwon-si (KR); Bok Gi Choi, Suwon-si (KR); Beak Won Jung, Suwon-si (KR); Dong Gi Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 12 days.

(21) Appl. No.: 16/381,673

(22) Filed: Apr. 11, 2019

(65) Prior Publication Data

US 2020/0234884 A1 Jul. 23, 2020

(30) Foreign Application Priority Data

Jan. 22, 2019 (KR) .................. 10-2019-0007916

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/2325* (2013.01); *H01G 4/248* (2013.01); *H01G 4/1227* (2013.01)

(58) Field of Classification Search
CPC ........ H01G 4/30; H01G 4/012; H01G 4/2325; H01G 4/248; H01G 4/1227
See application file for complete search history.

(56) References Cited

U.S. PATENT DOCUMENTS 6,729,213 B1  5/2004  Baba et al.
6,729,223 B2 * 5/2004  De Lapasse ............. F41H 5/26
                                                          42/111
(Continued)

FOREIGN PATENT DOCUMENTS

KR  10-2001-0020744 A   3/2001
KR  10-2013-0120814 A  11/2013
KR  10-2016-0012830 A   2/2016

OTHER PUBLICATIONS

Korea Office Action dated Apr. 23, 2020 issued in Korean Patent Application No. 10-2019-0007916 (with English translation).

*Primary Examiner* — Dion Ferguson
(74) *Attorney, Agent, or Firm* — Morgan, Lewis & Bockius LLP

(57) ABSTRACT

A capacitor component includes: a body including a plurality of dielectric layers and a plurality of internal electrodes stacked opposingly in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; and an external electrode disposed on the body and connected to the plurality of internal electrodes. The second surface includes a plurality of convex portions spaced apart from each other.

23 Claims, 14 Drawing Sheets

(51) Int. Cl.
*H01G 4/248* (2006.01)
*H01G 4/232* (2006.01)
*H01G 4/12* (2006.01)

(56) References Cited

U.S. PATENT DOCUMENTS

| | | | |
|---|---|---|---|
| 10,354,802 B1* | 7/2019 | Bae | H01G 4/2325 |
| 2013/0286538 A1 | 10/2013 | Kim et al. | |
| 2014/0160618 A1* | 6/2014 | Yoon | H01G 4/30 |
| | | | 361/301.4 |
| 2014/0182907 A1* | 7/2014 | Lee | H01G 4/30 |
| | | | 174/258 |
| 2015/0036262 A1* | 2/2015 | Kai | H01G 4/1209 |
| | | | 361/301.4 |
| 2016/0027583 A1 | 1/2016 | Ahn et al. | |
| 2016/0247632 A1* | 8/2016 | Tsukida | H01G 4/232 |
| 2017/0250026 A1* | 8/2017 | Mizuno | H01G 4/232 |
| 2017/0287643 A1* | 10/2017 | Kobayashi | H01G 4/232 |
| 2018/0190435 A1* | 7/2018 | Kishi | H01G 4/248 |
| 2018/0218958 A1* | 8/2018 | Suga | H01G 4/232 |
| 2018/0323010 A1* | 11/2018 | Park | H01G 2/065 |
| 2019/0164696 A1* | 5/2019 | Onodera | H01G 4/005 |
| 2020/0203074 A1* | 6/2020 | Ono | H01G 4/012 |

* cited by examiner

CAPACITOR COMPONENT AND METHOD FOR MANUFACTURING THE SAME

CROSS-REFERENCE TO RELATED APPLICATION(S)

This application claims benefit of priority to Korean Patent Application No. 10-2019-0007916 filed on Jan. 22, 2019 in the Korean Intellectual Property Office, the disclosure of which is incorporated herein by reference in its entirety.

TECHNICAL FIELD

The present disclosure relates to a capacitor component.

BACKGROUND

A multilayer ceramic capacitor (MLCC), a capacitor component, is a chip type condenser, mounted on the printed circuit boards of various types of electronic products, including image display devices, such as a liquid crystal display (LCD) and a plasma display panel (PDP), a computer, a smartphone, a mobile phone, and the like, serving to charge or discharge electricity.

The multilayer ceramic capacitor may be used as a component of various electronic devices due to advantages thereof, such as miniaturization, high capacity, and ease of mounting.

In recent years, as industry interest in electronic products has increased, multilayer ceramic capacitors have been required to have high reliability characteristics to be used in automobiles and infotainment systems.

Such a multilayer ceramic capacitor usually includes a process of sucking a ceramic green sheet by a vacuum hole of an adsorption apparatus, separating the ceramic green sheet from a release film, and then stacking the separated ceramic green sheet on a stacked body and pressurizing.

When a position of the sucked portion of respective ceramic green sheets of the stacked body by the vacuum hole is the same, there may be a problem in that pressure may not be transmitted to the vacuum hole at the time of pressurization, as a portion in which the pressure is not transmitted is accumulated, lifting may occur, such that an interlayer fault may occur. The interlayer fault is referred to as an interlayer fault due to hole damage.

SUMMARY

An aspect of the present disclosure may provide a capacitor component with high reliability.

According to an aspect of the present disclosure, a capacitor component may include: a body including a plurality of dielectric layers and a plurality of internal electrodes stacked opposingly in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; and an external electrode disposed on the body and connected to the plurality of internal electrodes. The second surface may include a plurality of convex portions spaced apart from each other.

According to another aspect of the present disclosure, a capacitor component may include: a body including a plurality of dielectric layers and a plurality of internal electrodes stacked opposingly in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; and an external electrode disposed on the body and connected to the plurality of internal electrodes. A first dielectric layer of the plurality of dielectric layers may include a first convex portion spaced apart from a second convex portion of a second dielectric layer of the plurality of the dielectric layers adjacent to the first dielectric layers.

According to an aspect of the present disclosure, a method for manufacturing a capacitor component may include: sucking a first ceramic green sheet formed on a first release film by a vacuum hole of an adsorption apparatus and separating the first ceramic green sheet from the first release film; stacking the first ceramic green sheet on a stacked body, and pressurizing the adsorption apparatus against the stacked body, with the first ceramic green sheet being disposed between the adsorption apparatus and the stacked body; sucking a second ceramic green sheet formed on a second release film by the vacuum hole of the adsorption apparatus and separating the second ceramic green sheet from the second release film; and stacking the second ceramic green sheet on the first ceramic green sheet, and pressurizing the adsorption apparatus against the stacked body, with the second ceramic green sheet being disposed between the first ceramic green sheet and the adsorption apparatus. After stacking the second ceramic green sheet, the first sucked portion of the first ceramic green sheet and the second sucked portion of the second ceramic green sheet may be spaced apart from each other.

According to an aspect of the present disclosure, a capacitor component may include: a body including a plurality of dielectric layers and a plurality of internal electrodes stacked opposingly in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; and an external electrode disposed on the body and connected to the plurality of internal electrodes. The second surface may include at least one convex portion.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
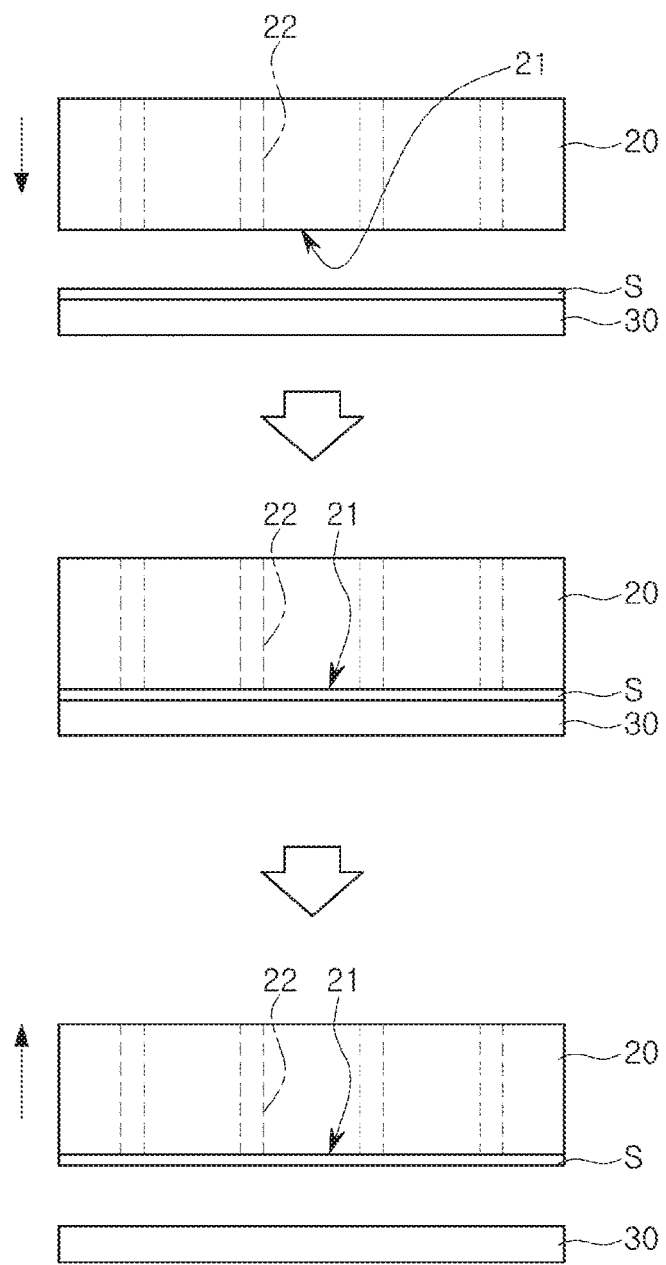
FIG. 1 is a schematic view illustrating a separation process operation for manufacturing a capacitor component.

Hereinafter, exemplary embodiments of the present disclosure will now be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity.

Further, in the drawings, elements having the same functions within the same scope of the inventive concept will be designated by the same reference numerals. Throughout the specification, when a component is referred to as "comprise" or "comprising," it means that it may include other components as well, rather than excluding other components, unless specifically stated otherwise.

In the drawings, an X direction may be defined as a second direction or a longitudinal direction, and a Y direction as a third direction or a width direction, and a Z direction as a first direction, a stacking direction or a thickness direction.

FIG. 1 is a schematic view illustrating a separation process operation for manufacturing a capacitor component.

Figure 2:
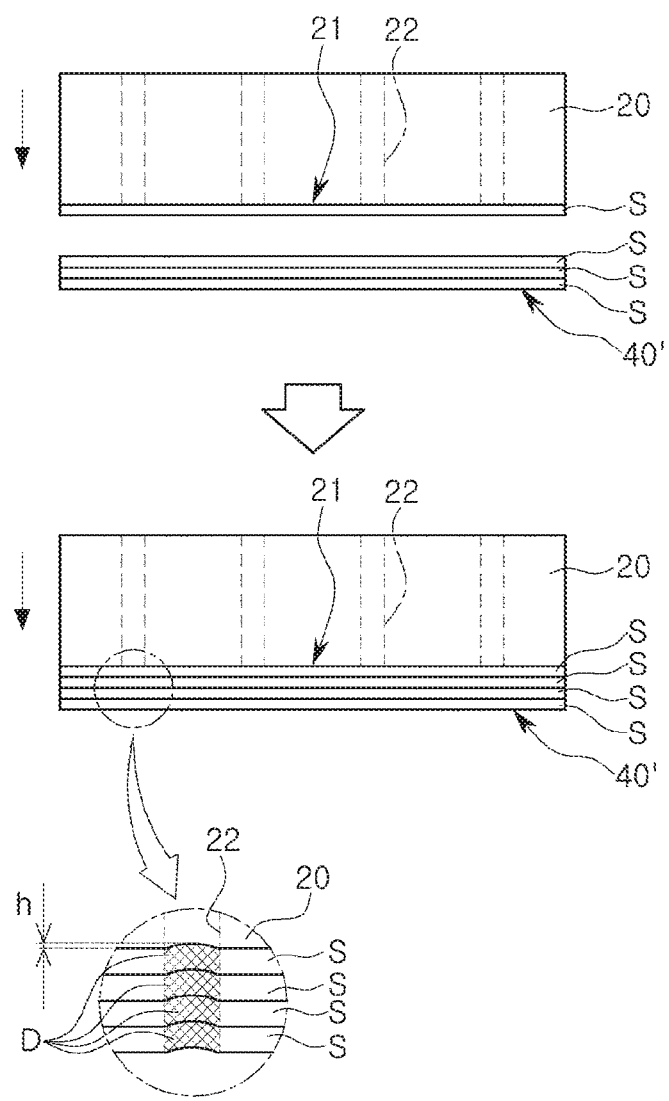
FIG. 2 is a schematic view illustrating a stacking process operation for manufacturing a capacitor component.

FIG. 2 is a schematic view illustrating a stacking process operation for manufacturing a capacitor component.

Figure 3:
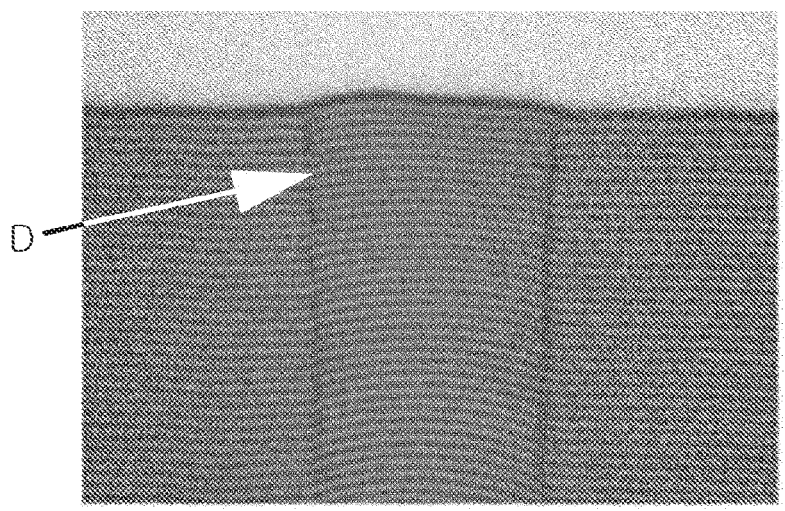
FIG. 3 is a photograph of an interlayer fault by hole damage.

FIG. 3 is a photograph of an interlayer fault caused by accumulation of hole damage.

Generally, a method for manufacturing a capacitor body may include a separation process and a stacked process for manufacturing a body.

Referring to FIG. 1, in a separation process, a ceramic green sheet S is sucked to one end of a vacuum hole 22 of an adsorption apparatus 20 when a vacuum or a negative pressure is provided to the vacuum hole 22 through another end of the vacuum hole 22 and is separated from a release film 30 on which the ceramic green sheet S has been formed.

Referring to FIG. 2, in a stacked process, the separated ceramic green sheet S is transferred to and stacked on a stacked body 40 on which a ceramic green sheet is stacked and pressurized/compressed against the stacked body 40 or against a support member (not shown) on which the stacked body 40 is disposed.

Referring to FIGS. 2 and 3, at the time of pressurization/compression, pressure applied on the adsorption apparatus 20 is transferred to the ceramic green sheet S against the stacked body 40 except a portion of the ceramic green sheet which is aligned with the end of the vacuum hole 22. In the portion of the ceramic green sheet S aligned to the vacuum hole 22, a lifting phenomenon may occur. For example, such a portion may protrude with respect to the other portion of the ceramic green sheet S and may become a convex portion. The lifting phenomenon is defined as hole damage. That is, the hole damage may be generated in a sucked portion D in the ceramic green sheet S, sucked by or aligned with the end of the vacuum hole 22 at the time of pressurization/compression.

When positions of the sucked portion D by vacuum holes of respective ceramic green sheets of a stacked body are the same (for example, positions of the sucked portion D by vacuum holes of respective ceramic green sheets of a stacked body are stacked on each other or overlap each other in a stacking direction), an interlayer fault may occur as hole damage is accumulated at the same position. As the interlayer fault occurs, short defect rates may increase and reliability may be deteriorated.

Therefore, in the present disclosure, accumulation of hole damage may be prevented by stacking the ceramic green sheet such that the positions of the sucked portion D in which hole damage is generated do not overlap, thereby reducing short defect rates of the capacitor component by suppressing the interlayer fault and improving reliability.

Capacitor Component

Figure 4:
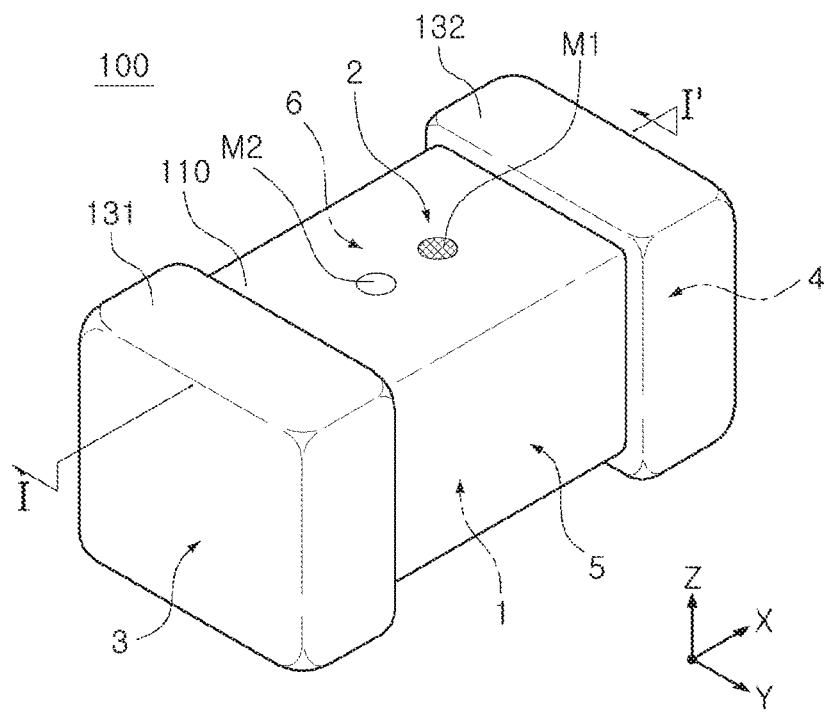
FIG. 4 schematically illustrates a perspective view of a capacitor body according to an exemplary embodiment in the present disclosure.

FIG. 4 schematically illustrates a perspective view of a capacitor component according to an exemplary embodiment in the present disclosure.

Figure 5:
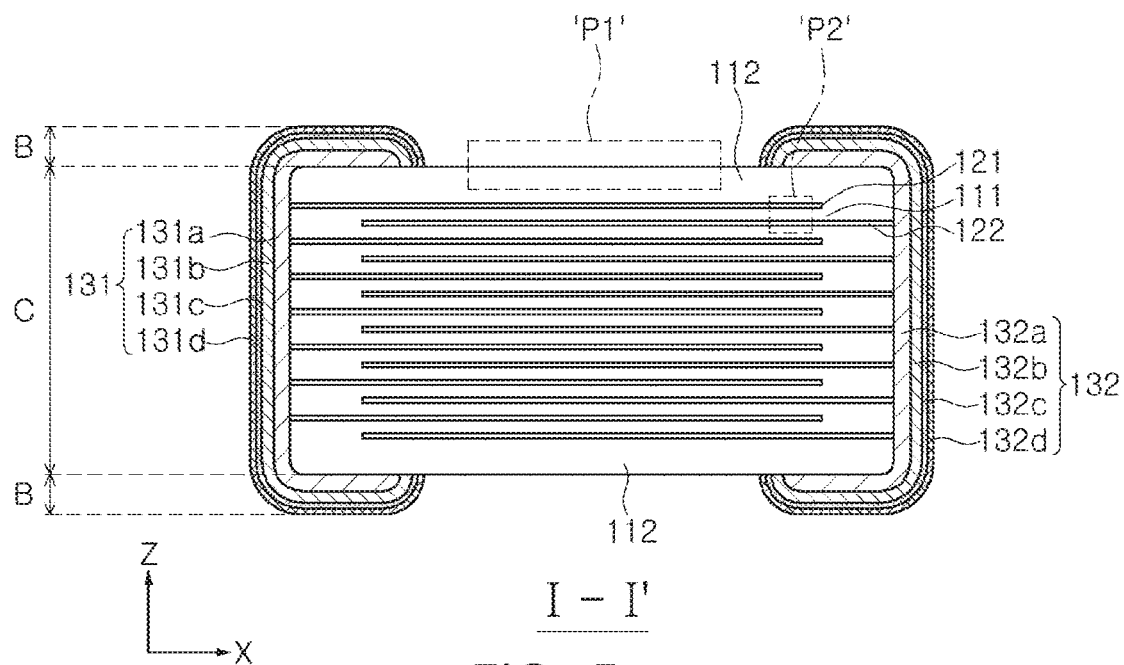
FIG. 5 schematically illustrates a cross-sectional view taken along line I-I' of FIG. 4.

FIG. 5 schematically illustrates a cross-sectional view taken along line I-I' of FIG. 4.

Figure 6A:
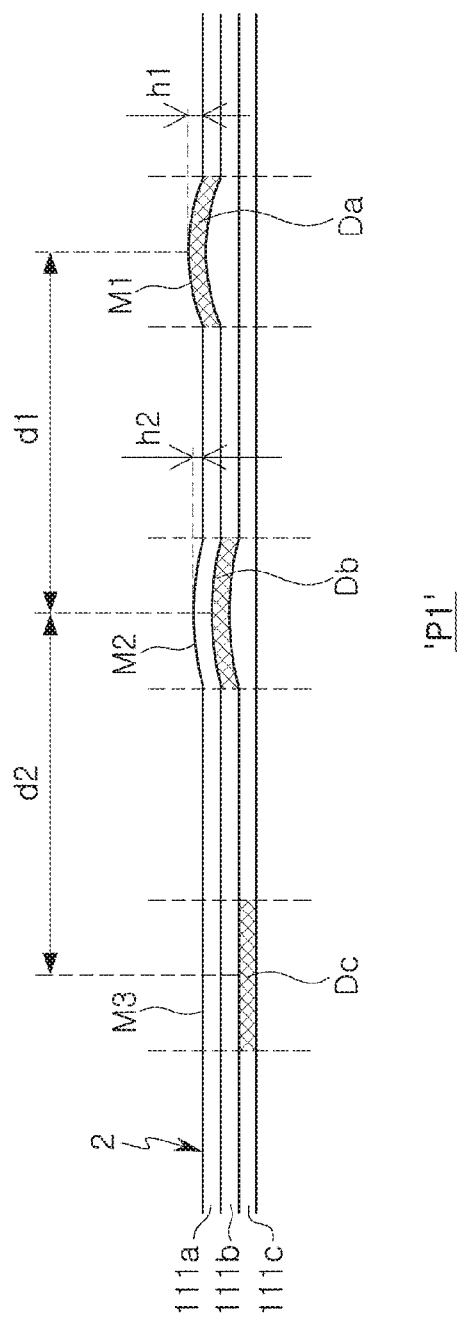
FIG. 6A is an enlarged view of a P1 region of FIG. 5.

FIG. 6A is an enlarged view of the P1 region of FIG. 5.

Figure 6B:
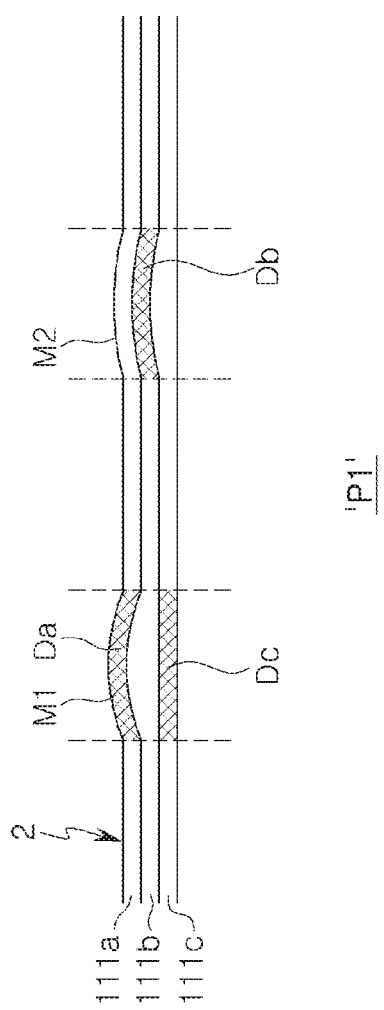
FIG. 6B is another enlarged view of a P1 region of FIG. 5.

FIG. 6B is another enlarged view of the P1 region of FIG. 5.

Figure 7:
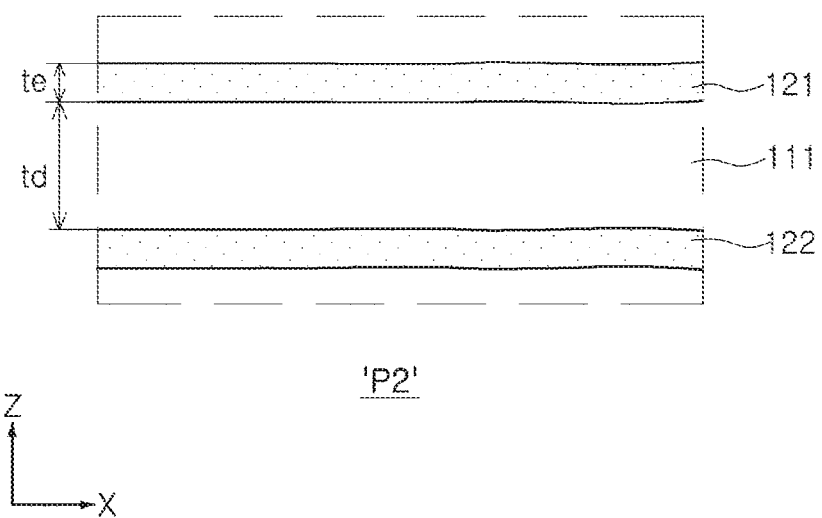
FIG. 7 is an enlarged view of a P2 region of FIG. 5.

FIG. 7 is an enlarged view of the P2 region of FIG. 5.

Hereinafter, a capacitor component according to an exemplary embodiment in the present disclosure will be described in detail with reference to FIGS. 4 to 7.

A capacitor component 100 according to an exemplary embodiment in the present disclosure may include a body 110 including a plurality of dielectric layers 111 and a plurality of internal electrodes 121 and 122 stacked opposingly in a first direction (a Z direction), and having first and second surfaces 1 and 2 opposing each other in the first direction (the Z direction), third and fourth surfaces 3 and 4 connected to the first and second surfaces and opposing each other in a second direction (an X direction), and fifth and sixth surfaces connected to the first to fourth surfaces and opposing each other in a third direction (a Y direction); and external electrodes 131 and 132 disposed in the body 110 and connected to the plurality of internal electrodes 121 and 122.

The body 110 has dielectric layers 111 and internal electrodes 121 and 122, alternately stacked.

The specific shape of the body 110 is not particularly limited, but as illustrated, the body 110 may have a hexahedral shape, or a similar shape. Due to shrinkage of a ceramic powder contained in the body 110 during a firing process, the body 110 may have a substantially hexahedral shape, but may not have a hexahedral shape having completely straight lines.

The body 110 may have first and second surfaces 1 and 2 opposing each other in a thickness direction (the Z direction), third and fourth surfaces 3 and 4 connected to the first and second surfaces 1 and 2 and opposing each other in a longitudinal direction (the X direction), and fifth and sixth surfaces 5 and 6 connected to the first and second surfaces 1 and 2 and the third and fourth surfaces 3 and 4 and opposing each other in a width direction (the Y direction).

The plurality of dielectric layers 111 forming the body 110 are in a sintered state and boundaries between adjacent dielectric layers 111 may be integrated so as to be difficult to confirm without using a scanning electron microscope (SEM).

According to an exemplary embodiment in the present disclosure, a raw material forming the dielectric layer 111 is not particularly limited as long as sufficient electrostatic capacity can be obtained. For example, a barium titanate-based material, a lead composite perovskite-based material, a strontium titanate-based material, or the like may be used.

As materials for forming the dielectric layer 111, a variety of ceramic additives, organic solvents, plasticizers, binders, dispersants, and the like, may be added to the barium titanate ($BaTiO_3$) powder, and the like, according to purposes of the present disclosure.

The plurality of internal electrodes 121 and 122 may be disposed so as to oppose each other with the dielectric layer 111 interposed therebetween.

The internal electrodes 121 and 122 may include first and second internal electrodes 121 and 122 alternately disposed to oppose each other with a dielectric layer interposed therebetween.

The first and second internal electrodes 121 and 122 may be exposed to the third and fourth surfaces 3 and 4 of the body 110, respectively.

The first internal electrode 121 may be spaced apart from a fourth surface 4 and be exposed through a third surface 3, and the second internal electrode 122 may be spaced apart from the third surface 3 and be exposed through a fourth surface 4. A first external electrode 131 may be disposed on the third surface 3 of the body and connected to the first internal electrode 121, and a second external electrode 132 may be disposed on the fourth surface 4 of the body and connected to the second internal electrode 122.

In this case, the first and second internal electrodes 121 and 122 may be electrically separated by the dielectric layer 111 disposed in the middle.

A material forming the first and second internal electrodes 121 and 122 is not particularly limited, and may be formed by printing for example, a noble metal material such as a palladium (Pd), a palladium-silver (Pd—Ag) alloy, and the like, and a conductive paste consisting of at least one or more of nickel (Ni) and copper (Cu).

The conductive paste may be printed by a screen printing method, a gravure printing method, or the like, but the present disclosure is not limited thereto.

In this case, a capacitor component 100 according to an exemplary embodiment in the present disclosure may include a capacitance forming portion formed within the body 110 and including a first internal electrode 121 and a second internal electrode 122 disposed to oppose each other with the dielectric layer 111 interposed therebetween and having a capacitance formed therein and a cover portion 112 formed in upper and lower portions of the capacitance forming portion.

The cover portion 112 may not include the internal electrodes 121 and 122, and may include the same material as the dielectric layer 111. That is, the cover portion 112 may include a ceramic material, for example, a barium titanate-based material, a lead composite perovskite-based material, a strontium titanate-based material, or the like.

The cover portion 112 may be formed by stacking a single dielectric layer or two or more dielectric layers on upper and lower surfaces of the capacitance forming portion in an up-and-down direction, respectively, and basically, may prevent damage to the internal electrode due to physical or chemical stress.

Referring to FIG. 6A, the second surface 2 of the body 110 may include a plurality of convex portions M1 and M2, and the plurality of convex portions M1 and M2 may be disposed to be spaced apart from each other.

In this case, the plurality of convex portions may be disposed to be spaced apart from each other in the second direction, and the heights of the convex portions may be 5 μm or less. For example, a line L1 connecting centers of the plurality of convex portions on the second surface 2 of the body 110 may be parallel to or substantially parallel to the second direction.

In addition, when the convex portion M1 having the greatest height from the second surface 2 and the convex portion M2 having the next greatest height from the second surface 2 among the convex portions are defined as first and second convex portions M1 and M2, respectively, the first and second convex portions M1 and M2 may be disposed to be spaced apart from each other.

In this case, a distance d1 between centers of the first convex portion and the second convex portions M1 and M2 is not particularly limited as long as the first and second convex portions M1 and M2 may be disposed apart from each other. For example, as the distance d1 between centers of the first and second convex portions M1 and M2 becomes closer, the probability of the occurrence of an interlayer fault increases due to the accumulation of hole damage. Therefore, the distance d1 between centers of the first and second convex portions M1 and M2 may be set to be 300 μm or more.

Referring to FIGS. 2 and 3, pressure may not be transmitted to a vacuum hole 22 when pressure is applied, such that a lifting phenomenon may occur in a sucked portion D, and the lifting phenomenon may be referred to as hole damage. That is, the hole damage may occur in the sucked portion D sucked by or aligned with the end of the vacuum hole 22.

When positions of the sucked portions D by the vacuum holes of respective ceramic green sheets of a stacked body are the same (for example, positions of the sucked portion D by vacuum holes of respective ceramic green sheets of a stacked body are stacked on each other or overlap each other in a stacking direction), an interlayer fault may occur as the hole damage is accumulated at the same position. As the interlayer fault occurs, the short defect rates may increase and the reliability may be deteriorated.

However, in the present disclosure, the accumulation of the hold damages may be prevented by stacking the ceramic green sheets such that at least the positions of the sucked portions D of adjacent ceramic green sheets in which hole damage occur do not overlap, thereby reducing the short defect rates of the capacitor components by suppressing the interlayer fault, and improving reliability. A sucked portion of a dielectric layer may include a convex portion with respect to a portion of the dielectric layer surrounding the sucked portion. The sucked portion or the convex portion may refer to a deformed portion of the dielectric layer, caused by a lifting phenomenon. A degree of protruding of such a convex portion may be maintained before disposing another dielectric layer thereon, and may be reduced after disposing another dielectric layer having a sucked portion offset from the sucked portion of the early formed dielectric layer. In one example, the accumulation of the hold damages may be prevented by stacking the ceramic green sheets such that the positions of the sucked portions D of the ceramic green sheets in which hole damage occur do not overlap.

Referring to FIG. 6A, since dielectric layers 111b and 111c located below a dielectric layer 111a disposed on a second surface may also affect the second surface of the body to form convex portions, the second surface may include a plurality of convex portions. Therefore, the first convex portion M1 is a sucked portion Da of the dielectric layer 111a disposed on the second surface, and the second convex portion M2 may be located on a sucked portion Db of a dielectric layer 111b, in contact with the dielectric layer 111a disposed on the second surface.

Since the sucked portion of the dielectric layer has a smaller influence on the second surface as the sucked portion of the dielectric layer is further away from the second surface, except for the convex portions M1 and M2 formed by the sucked portion Da of the dielectric layer 111a disposed on the second surface and the sucked portion Db of the dielectric layer 111b formed directly below the dielectric layer 111a disposed on the second surface, the second surface may be close to a plane.

In addition, the first convex portion M1 may be confirmed with a naked eye, but the second convex portion M2 formed by the sucked portion Db of the dielectric layer 111b formed directly below the dielectric layer 111a disposed on the second surface may be difficult to be confirmed with the naked eye. However, the second convex portion M2 formed by the sucked portion Db of the dielectric layer 111b formed directly below the dielectric layer 111a disposed on the second surface may be clearly confirmed by using a 3D surface roughness tester.

The height of the convex portion may be 5 μm or less. In addition, when the convex portion M1 having the greatest height h1 from the second surface and the convex portion M2 having the next greatest height h2 from the second surface among the plurality of convex portions are defined as first and second convex portions M1 and M2, respectively, the height h1 of the first convex portion M1 may be 5 μm or less, and the height h2 of the second convex portion M2 may be ⅔ or less of the height h1 of the first convex portion M1. For example, the height h2 of the second convex portion M2 may be 3.33 μm or less.

The height h1 of the convex portion M1 having the greatest height from the second surface may be as low as 5 μm or less, which is very low, since hole damage is not accumulated, since the positions of the sucked portions D are stacked so as not to be overlapped. That is, the height h1 of the first convex portion may be much lower than the height h of the convex portion of FIG. 2, in which hole damage is accumulated. In one example, the sucked portions of two dielectric layers not immediately adjacent to each other (for example, two dielectric layers not in direct contact with each other) may completely overlap, or partially overlap, with each other in the stacking direction. For instance, the sucked portion Da may be disposed on the sucked portion Dc to completely aligned with, or partially aligned with, the sucked portion Dc in the stacking direction, as shown in FIG. 6B. Thus, at the time of disposing a plurality of ceramic green sheets to a stacked body, the position of the adsorption apparatus 20 may alternate in one predetermined direction, for example, the second direction or the third direction, with respect to the formed portion of the stacked body. The displacements of the adsorption apparatus 20 to sequentially dispose the plurality of ceramic green sheets may be in the order of R0, R1, R0, R1, . . . , or in the order of R0, R1, R2, R1, R0, R1, R2, R1, R0, . . . , in which R0, R1, and R2 are coordinates in the predetermine direction and min(|R0-R1|, |R1-R2|, and |R0-R2|) may be 300 μm or more, although it is not limited thereto.

In addition, since the sucked portion of the dielectric layer, distant from the second surface, has little influence on the second surface, the height between the convex portions may be different. Accordingly, the height h2 of the second convex portion may be ⅔ or less of the height h1 of the first convex portion.

The convex portion may be circular in the second and third direction cross-sections.

Since pressure is not transmitted to the vacuum hole 22 when the pressure is applied, the sucked portion D may have a shape corresponding to the vacuum hole 22, and the vacuum hole 22 may have a generally circular shape. Therefore, the convex portion formed by an influence of the sucked portion may be circular.

In addition, a diameter of the convex portion may be 250 μm or less as it has a shape and size corresponding to a diameter of the vacuum hole.

Referring to FIG. 6A, the dielectric layer 111 may include the sucked portion D, and a distance from a center of a sucked portion Db of the dielectric layer 111b to centers of sucked portions Da and Dc of adjacent dielectric layers 111a and 111c may be 300 μm or more.

Since the probability of the interlayer fault is increased by accumulating hole damage, as distances d1 and d2 from the center of the sucked portion of the dielectric layer to the centers of the adjacent sucked portions are closer, the distances d1 and d2 from the center of the sucked portion of the dielectric layer to the centers of the adjacent sucked portions may be 300 μm or more.

Meanwhile, referring to FIG. 7, thicknesses of the internal electrodes 121 and 122 is defined as te and a thickness of the dielectric layer 111 is defined as td, td>2*te may be satisfied.

That is, in an exemplary embodiment in the present disclosure, the thickness td of the dielectric layer 111 may be greater than twice the thickness te of the internal electrodes 121 and 122.

In general, high voltage electric field electronic components may have a reliability problem due to a decrease in a breakdown voltage under a high voltage environment.

A capacitor component according to an exemplary embodiment in the present disclosure may be formed by making a thickness td of the dielectric layer 111 greater than twice a thickness te of the internal electrodes 121 and 122 in order to prevent the breakdown voltage from lowering under the high voltage environment. The breakdown voltage characteristic may be improved by increasing the thickness of the dielectric layer, which is a distance between the internal electrodes.

When the thickness td of the dielectric layer 111 is twice or less than the thickness te of the internal electrodes 121 and 122, the breakdown voltage may be lowered since the thickness of the dielectric layer, which is a distance between the internal electrodes, is thin.

The thickness te of the internal electrode may be less than 1 μm, and the thickness td of the dielectric layer may be less than 2.8 μm, but the present disclosure is not limited thereto.

External electrodes 131 and 132 may be disposed on the body and may be connected to the plurality of internal electrodes 121 and 122.

The external electrodes 131 and 132 may include a first external electrode 131 disposed on a third surface 3 of the body and a second external electrode 132 disposed on a fourth surface 4 of the body.

The first external electrode 131 may include a first electrode layer 131a connected to the first internal electrode 121 and a first conductive resin layer 131b disposed on the first electrode layer 131a.

The second external electrode 132 may include a second electrode layer 132a connected to the second internal electrode 122 and a second conductive resin layer 132b disposed on the second electrode layer 132a.

The first external electrode 131 may further include a first Ni plating layer 131c disposed on the first conductive resin layer 131b and a first Sn plating layer disposed on the first Ni plating layer.

The second external electrode 132 may further include a second Ni plating layer 132c disposed on the second conductive resin layer 132b and a second Sn plating layer 132d disposed on the second Ni plating layer.

The first and second external electrodes 131 and 132 may be electrically connected to the first and second internal electrodes 121 and 122, respectively to form capacitance, and the second external electrode 132 may be connected to a potential different from that of the first external electrode 131.

The electrode layers 131a and 132a may include a conductive metal and a glass.

The conductive metal used in the electrode layers 131a and 132a is not particularly limited as long as it is a material that can be electrically connected to the plurality of internal electrodes for forming capacitance, for example, may be one selected from a group consisting of copper (Cu), silver (Ag), nickel (Ni), and alloys thereof.

The electrode layers 131a and 132a may be formed by applying a conductive paste prepared by adding glass frit to the conductive metal powder and then firing the paste.

The conductive resin layers 131b and 132b may be formed on the electrode layers 131a and 132a, and may be formed to completely cover the electrode layers 131a and 132.

That is, a distance from the third surface 3 of the body 110 to the end of a band portion B of the first electrode layer 131a may be shorter than a distance to the end of the band portion B of the first conductive resin layer 131b, and a distance from the fourth surface 4 of the body 110 to the end of the band portion B of the second electrode layer 132a may be shorter than a distance to the end of the band portion B of the second conductive resin layer 132b.

Conductive resin layers 131b and 132b may include a conductive metal and a base resin.

The base resin contained in the conductive resin layers 131b and 132b is not particularly limited as long as it has bondability and impact absorbing ability and may be mixed with the conductive metal powder to form a paste, for example, the base resin may include, for example, an epoxy resin.

The conductive metal contained in the conductive resin layers 131b and 132b is not particularly limited as long as it is a material that can be electrically connected to the electrode layers 131a and 132a, for example, may include one or more selected from a group consisting of copper (Cu), silver (Ag), nickel (Ni), and alloys thereof.

The Ni plating layers 131c and 132c may be formed on the conductive resin layers 131b and 132b, and may be formed to completely cover the conductive resin layers 131b and 132b.

The Sn plating layers 131d and 132d may be formed on the Ni plating layers 131c and 132c, and may be formed to completely cover the Ni plating layers 131c and 132c.

The Sn plating layers 131d and 132d may serve to improve mounting characteristics.

The external electrodes 131 and 132 may include a connection portion C disposed on the third surface 3 or the fourth surface 4 of the body and a band portion B extending to portions of the first and second surfaces 1 and 2 from the connection portion C. In this case, the band portion B may extend not only to portions of the first and second surfaces 1 and 2, but also to portions of the fifth and sixth surfaces 5 and 6 from the connection portion C.

Method for Manufacturing a Capacitor Component

Figure 8:
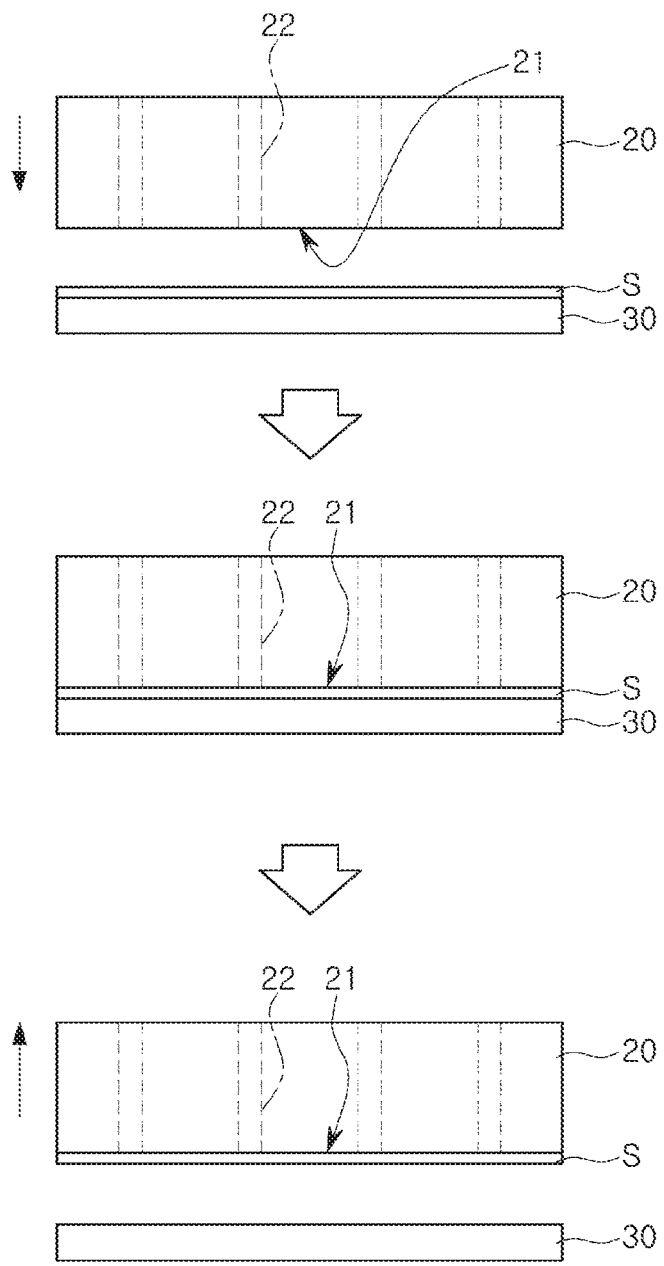
FIG. 8 is a schematic view illustrating a separation process operation for manufacturing a capacitor component according to an exemplary embodiment in the present disclosure.

FIG. 8 is a schematic view illustrating a separation process in a manufacturing operation of a capacitor component according to an exemplary embodiment in the present disclosure.

Figure 9:
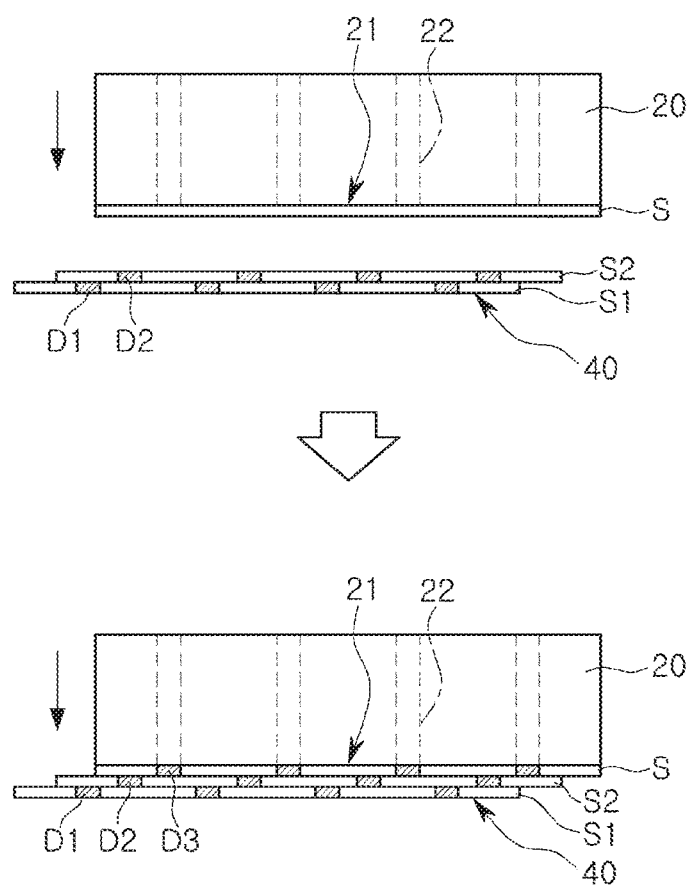
FIG. 9 is a schematic view of a stacking process operation for manufacturing a capacitor component according to an exemplary embodiment in the present disclosure.

FIG. 9 is a schematic view illustrating a stacked process in a manufacturing operation of a capacitor component according to an exemplary embodiment in the present disclosure.

Hereinafter, a capacitor component according to an exemplary embodiment in the present disclosure will be described in detail with reference to FIGS. 8 and 9.

A method for manufacturing a capacitor component according to an exemplary embodiment in the present disclosure may include an operation of sucking a ceramic green sheet S formed on a release film 30 by a vacuum hole 22 of an adsorption apparatus 20 and separating the ceramic green sheet S from the release film; and an operation of stacking the separated ceramic green sheet on a stacked body 40 on which a ceramic green sheet is stacked and pressurizing. When a portion of the ceramic green sheet which has been sucked by or aligned with the end of the vacuum hole is defined as a sucked portion D, a sucked portion D3 of the separated ceramic green sheet during the stacking may be stacked and pressurized so as not to overlap a sucked portion D2 of the ceramic green sheet located at the uppermost portion of the stacked body.

Referring to FIG. 8, the separation process is a process of sucking the ceramic green sheet S onto an adsorption surface 21 by the vacuum hole 22 of the adsorption apparatus 20, and separated the ceramic green sheet S from the release film 30.

The vacuum hole 22 may serve to suck air and suck the ceramic green sheet S.

In this case, the diameter of the vacuum hole 22 is not particularly limited, but may be 250 μm or less. In the case in which the diameter thereof exceeds 250 μm, a moving distance for stacking the sucked portion D3 of the separated ceramic green sheet S so as not to overlap the sucked portion D2 of the ceramic green sheet S2 located at the uppermost portion of the stacked body 40, may be increased too much, and hole damage may be increased.

The smaller the diameter of the vacuum hole 22 is, the more it is advantageous, such that it is not particularly limited. However, when an etching process method, a general manufacturing method for forming the vacuum hole 22, is applied, it may be difficult to form the vacuum hole 22 having a diameter less than 180 μm, such that the diameter thereof may be 180 μm or more.

Referring to FIG. 9, the stacking process is a process of stacking and pressurizing the sucked portion D3 of the separated ceramic green sheet so as not to overlap the sucked portion D2 of the ceramic green sheet located at the uppermost portion of the stacked body 40.

Accordingly, since the sucked portion D3 of the separated ceramic green sheet S and the sucked portion D2 of the ceramic green sheet S2, located at the uppermost portion of the stacked body 40, are not overlapped with each other, accumulation of the hole damage may be prevented, an interlayer fault may be suppressed and the reliability of the capacitor component may be improved.

In this case, it may be stacked and pressurized such that the distance from the center of the sucked portion D3 of the separated ceramic green sheet S to the center of the sucked portion D2 of the ceramic green sheet S3 located at the uppermost portion of the stacked body 50 are 300 μm or more.

After the separation process and the stacking process, as described above, are repeated and the stacked body of the desired thickness is formed, a body of a capacitor component may be obtained by cutting and firing. Then, the capacitor component may be completed through a forming process of the external electrode.

Figure 10A:
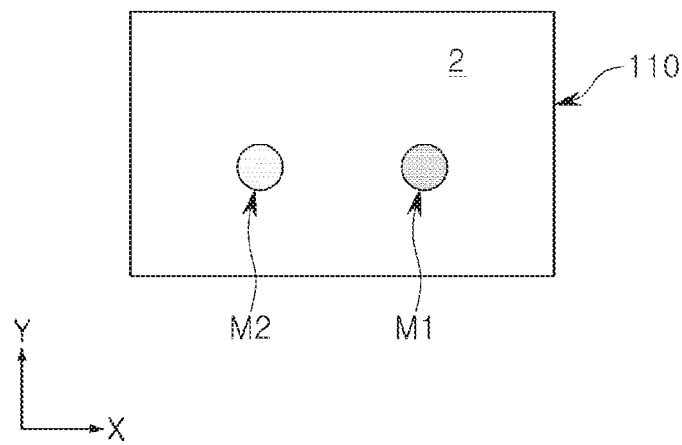
FIG. 10A shows a plan view of a second surface of a capacitor body shown in FIG. 4, and FIGS. 10B-10I show a plan view of a second surface of a capacitor body according to other exemplary embodiments in the present disclosure.
Figure 10B:
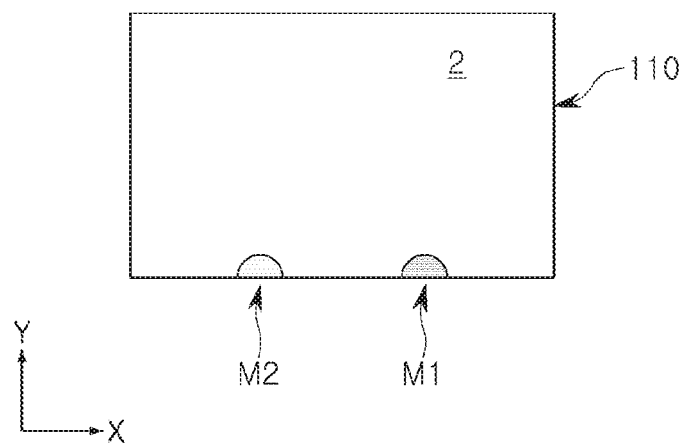

FIG. 10A shows a plan view of a second surface of a capacitor body shown in FIG. 4. FIGS. 10B-10I respectively show a plan view of a second surface of a capacitor body according to other exemplary embodiments in the present disclosure.

Referring to FIG. 10A, the plurality of convex portions M1 and M2 each having a shape corresponding to a shape of the vacuum hole may be spaced apart from each other.

Figure 10C:
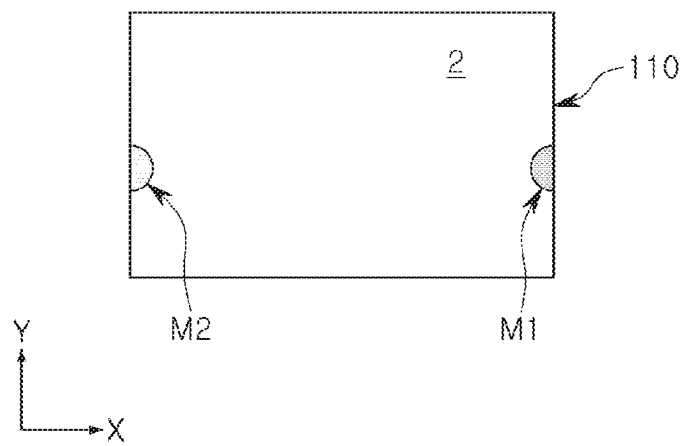
Figure 10D:
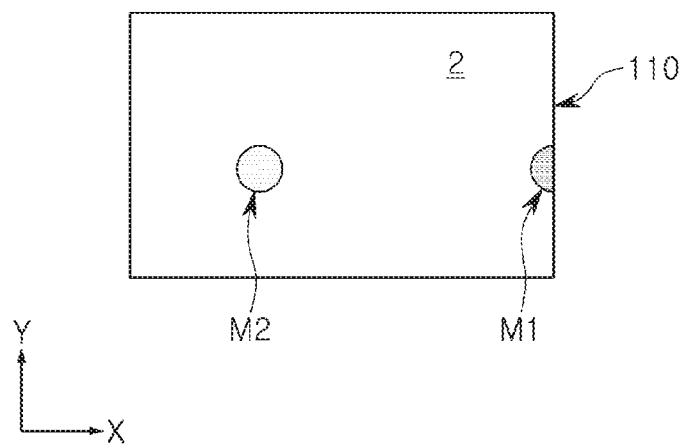
Figure 10E:
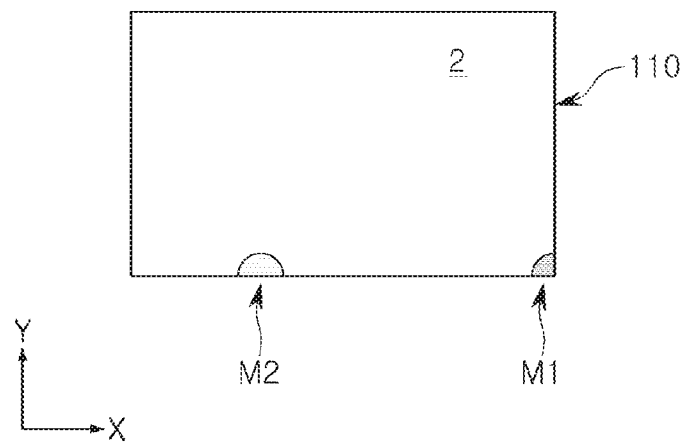

Referring to FIGS. 10C-10E, one or more of the plurality of convex portions M1 and M2 may be disposed on an edge at which the second surface 2 and one of the third to sixth surfaces meet, and thus, a shape of the one or more of the plurality of convex portions M1 and M2 disposed on the edge may be different from that shown in FIG. 10A, when a portion thereof is removed by a dicing process to dice a stacked body to form capacitor bodies. For example, the one or more of the plurality of convex portions M1 and M2 disposed on the edge may have a side surface coplanar with one of the third to sixth surfaces, and the shape of the one or more of the plurality of convex portions M1 and M2 disposed on the edge may correspond to a portion of the shape of the plurality of convex portions M1 and M2 shown in FIG. 10A. The shape of the one or more of the plurality of convex portions M1 and M2 may be a semicircle or the like, in a case in which the end of the vacuum hole has a circular shape.

Figure 10F:
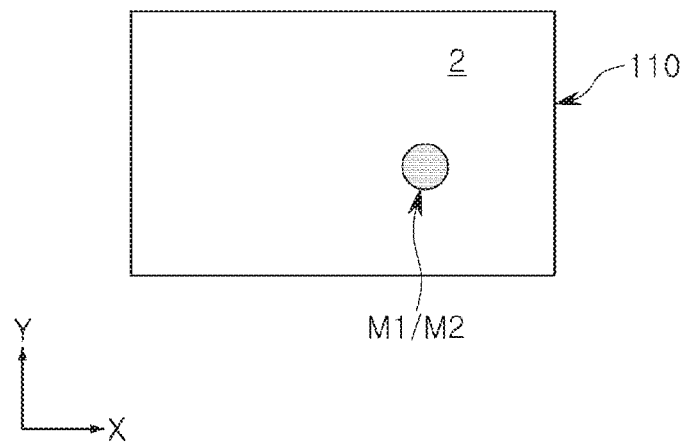
Figure 10G:
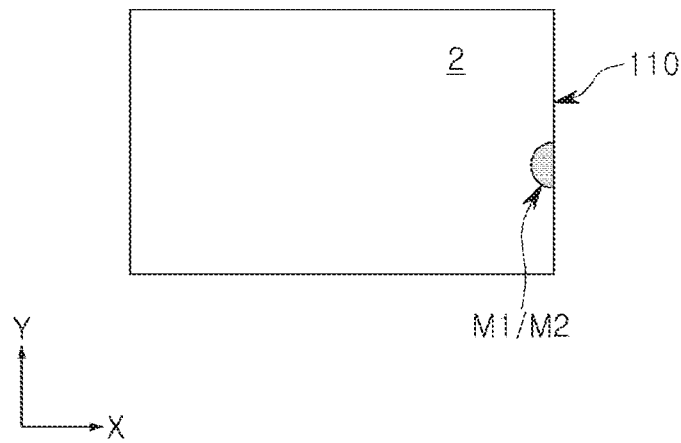
Figure 10H:
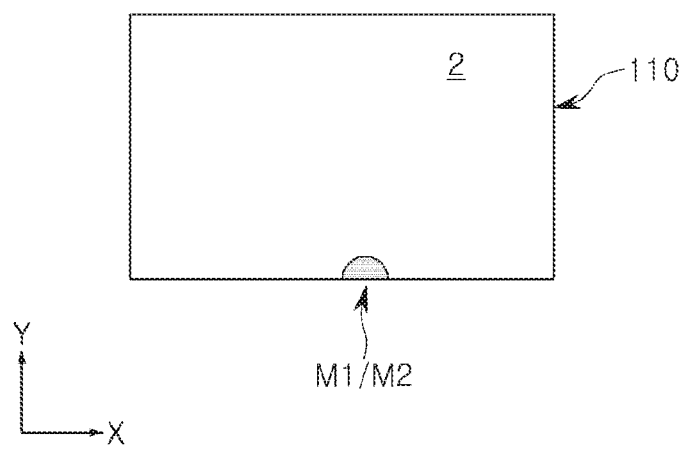
Figure 10I:
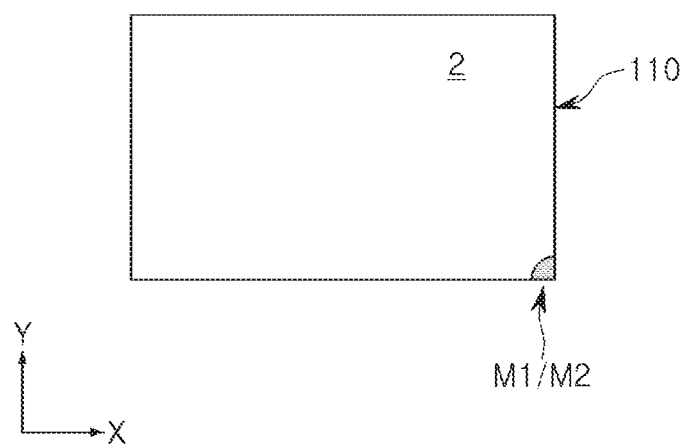

FIGS. 10F-10H show a plane view of a second surface of a body, in which only one convex portion may be included in the second surface.

Referring to FIGS. 10F-10H, only one convex portion M1 or M2 may be included in the second surface 2 of the body 110. The only one convex portion M1 or M2 may be disposed on the second surface 2 and spaced apart from an edge at which the second surface 2 and one of the third to sixth surfaces meet, as shown in FIG. 10E, or the only one convex portion M1 or M2 may be disposed on the edge at which the second surface 2 and one of the third to sixth surfaces meet, as shown in FIGS. 10E-10H.

As set forth above, according to the exemplary embodiment in the present disclosure, there is an effect of capable of improving the reliability of the capacitor component by stacking the positions of the sucked portions in which hole damage occur so as not to overlap each other.

However, various and advantageous advantages and effects of the present invention are not limited to the above description, and can be more easily understood in the course of describing a specific embodiment of the present invention.

While exemplary embodiments have been shown and described above, it will be apparent to those skilled in the art that modifications and variations could be made without departing from the scope of the present invention as defined by the appended claims.

What is claimed is:

1. A capacitor component, comprising:
 a body including a plurality of dielectric layers and a plurality of internal electrodes, stacked opposingly in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; and
 an external electrode disposed on the body and connected to one or more of the plurality of internal electrodes,
 wherein the second surface includes a plurality of convex portions spaced apart from each other, and
 the plurality of convex portions include a first convex portion having the greatest height from the second surface and a second convex portion having the next greatest height from the second surface.

2. The capacitor component of claim 1, wherein a distance between centers of the first and second convex portions is 300 μm or more.

3. The capacitor component of claim 1, wherein a height of the first convex portion is 5 μm or less, and a height of the second convex portion is ⅔ or less of the height of the first convex portion.

4. The capacitor component of claim 1, wherein the plurality of convex portions are disposed to be spaced apart from each other in the second direction.

5. The capacitor component of claim 1, wherein a height of the first convex portion is 5 μm or less.

6. The capacitor component of claim 1, wherein one of the plurality of convex portions is circular.

7. The capacitor component of claim 6, wherein a diameter of the one of plurality of convex portions is 250 μm or less.

8. The capacitor component of claim 1, wherein a distance between convex portions of adjacent dielectric layers is 300 μm or more.

9. The capacitor component of claim 1, wherein $td > 2*te$ is satisfied, in which te is a thickness of one of the plurality of internal electrodes, and td is a thickness of one of the plurality of dielectric layers.

10. The capacitor component of claim 1, wherein the external electrode comprises an electrode layer and a conductive resin layer disposed on the electrode layer.

11. The capacitor component of claim 10, wherein the electrode layer comprises a glass and one or more conductive metal selected from a group consisting of copper (Cu), silver (Ag), nickel (Ni), and alloys thereof.

12. The capacitor component of claim 10, wherein the conductive resin layer comprises a base resin and at least one or more conductive metal selected from a group consisting of copper (Cu), silver (Ag), nickel (Ni), and alloys thereof.

13. The capacitor component of claim 1, wherein a line connecting centers of the plurality of convex portions on the second surface is substantially parallel to the second direction.

14. The capacitor component of claim 1, wherein one or more of the plurality of convex portions are disposed on edge at which the second surface and one of the third to sixth surfaces meet.

15. A capacitor component comprising:
 a body including a plurality of dielectric layers and a plurality of internal electrodes, stacked opposingly in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; and an external electrode disposed on the body and connected to one or more of the plurality of internal electrodes, wherein a first dielectric layer of the plurality of dielectric layers includes a first convex portion spaced apart from a second convex portion of a second dielectric layer of the plurality of dielectric layers adjacent to the first dielectric layer, and a height of the first convex portion is different from a height of the second convex portion.

16. The capacitor component of claim 15, wherein a distance between the centers of the first and second convex portions is 300 µm or more.

17. The capacitor component of claim 15, wherein the second surface comprises third and fourth convex portions, the third convex portion is the first convex portion of the first dielectric layer disposed in the second surface, and the fourth convex portion is located on the second convex portion of the second dielectric layer, in contact with the first dielectric layer.

18. The capacitor component of claim 17, wherein a height of the third convex portion from the second surface is 5 µm or less.

19. The capacitor component of claim 17, wherein a height of the fourth convex portion from the second surface is ⅔ or less of the height from the second surface of the third convex portion.

20. A capacitor component, comprising:

a body including a plurality of dielectric layers and a plurality of internal electrodes, stacked opposingly in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; and an external electrode disposed on the body and connected to one or more of the plurality of internal electrodes, wherein the second surface includes at least one convex portion, and a height of the at least one convex portion is 5 µm or less.

21. The capacitor component of claim 20, wherein the height of the at least one convex portion is 3.33 µm or less.

22. The capacitor component of claim 20, wherein a diameter of the at least one convex portion is 250 µm or less.

23. The capacitor component of claim 20, wherein the at least one convex portion is disposed on an edge at which the second surface and one of the third to sixth surfaces meet.

* * * * *